(12) United States Patent
Harmouch et al.

(10) Patent No.: US 10,883,576 B2
(45) Date of Patent: Jan. 5, 2021

(54) PLATE LINK CHAIN

(71) Applicant: Schaeffler Technologies AG & Co. KG, Herzogenaurach (DE)

(72) Inventors: Alaa Harmouch, Rheinstetten (DE); Sandra Schaub, Oberkirch (DE); Stephan Penner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 130 days.

(21) Appl. No.: 15/761,606

(22) PCT Filed: Aug. 25, 2016

(86) PCT No.: PCT/DE2016/200397
§ 371 (c)(1),
(2) Date: Mar. 20, 2018

(87) PCT Pub. No.: WO2017/050325
PCT Pub. Date: Mar. 30, 2017

(65) Prior Publication Data
US 2018/0347674 A1      Dec. 6, 2018

(30) Foreign Application Priority Data
Sep. 22, 2015   (DE) .......................... 10 2015 218 125

(51) Int. Cl.
*F16H 9/24*         (2006.01)
*F16G 5/18*         (2006.01)
(Continued)

(52) U.S. Cl.
CPC .................. *F16H 9/24* (2013.01); *F16G 1/24* (2013.01); *F16G 5/16* (2013.01); *F16G 5/18* (2013.01);
(Continued)

(58) Field of Classification Search
CPC ..... F16G 5/18; F16G 5/16; F16G 1/28; F16G 13/04; F16G 13/06; F16G 13/07;
(Continued)

(56) References Cited

U.S. PATENT DOCUMENTS 1,727,129  A  *  9/1929  Morse ..................... F16G 13/08
                                                                    474/213
3,222,946  A  * 12/1965  Steuer ....................... F16G 5/20
                                                                    474/201
(Continued)

FOREIGN PATENT DOCUMENTS

CN      101960171 A      1/2011
CN      102753857 A     10/2012
(Continued)

OTHER PUBLICATIONS

DE102013222925(A1)Translation; Plate-link chain for continuously variable transmission of motor car; Ochs et al; Published: Jun. 5, 2014; Espacenet (Year: 2014).*
(Continued)

*Primary Examiner* — Michael R Mansen
*Assistant Examiner* — Raveen J Dias
(74) *Attorney, Agent, or Firm* — Kevin L. Parks

(57) ABSTRACT

A plate link chain for a continuously variable transmission in a motor vehicle comprising chain links. The chain links have link plates coupled to one another by pairs of rocker pins and at least two different sprocket pitches. At least one absorption mass is arranged between two pairs of rocker pins in an absorption space within a link plate inner contour.

12 Claims, 3 Drawing Sheets

(51) Int. Cl.
*F16G 13/02* (2006.01)
*F16G 5/16* (2006.01)
*F16G 1/24* (2006.01)
*F16G 13/07* (2006.01)
*F16G 13/06* (2006.01)

(52) U.S. Cl.
CPC ............. *F16G 13/02* (2013.01); *F16G 13/06* (2013.01); *F16G 13/07* (2013.01)

(58) Field of Classification Search
CPC ... F16G 9/08; F16G 13/02; F16G 5/00; F16H 9/24; F16H 15/124
See application file for complete search history.

(56) References Cited

U.S. PATENT DOCUMENTS

| | | | | |
|---|---|---|---|---|
| 4,642,079 | A * | 2/1987 | Horowitz | F16G 5/18 474/206 |
| 5,700,217 | A * | 12/1997 | Wakabayashi | F16G 13/04 474/214 |
| 6,346,058 | B1 * | 2/2002 | Linnenbrugger | F16G 5/18 474/212 |
| 6,527,657 | B2 * | 3/2003 | Sakakibara | F16G 5/18 474/242 |
| 2003/0186767 | A1 * | 10/2003 | Greiter | B21L 15/005 474/215 |
| 2007/0197331 | A1 * | 8/2007 | Junig | F16G 5/18 474/215 |
| 2007/0272523 | A1 * | 11/2007 | Vietoris | F16G 13/02 198/851 |
| 2008/0070732 | A1 | 3/2008 | Ledvina | |
| 2015/0285338 | A1 * | 10/2015 | Penner | F16G 13/08 474/206 |

FOREIGN PATENT DOCUMENTS

| | | | |
|---|---|---|---|
| CN | 104813066 A | 7/2015 | |
| DE | 19951949 A1 | 5/2000 | |
| DE | 10036258 A1 | 3/2001 | |
| DE | 10047979 A1 | 4/2001 | |
| DE | 10203942 A1 * | 9/2002 | ............... F16G 5/18 |
| DE | 102012222007 A1 | 6/2014 | |
| DE | 102013222925 A1 | 6/2014 | |
| JP | 2005531734 A | 10/2005 | |
| JP | 2008215497 A | 9/2008 | |
| JP | 2008267579 A | 11/2008 | |
| JP | 2009068685 A2 | 4/2009 | |
| JP | 2009197997 A | 9/2009 | |
| JP | 2011144874 A | 7/2011 | |
| WO | 2009/093117 A1 | 7/2009 | |

OTHER PUBLICATIONS

DE10203942 (B4) Translation; Sprocket chain for infinitely variable transmission; Linnenbruegger et al; Published: Feb. 20, 2014; Espacenet (Year: 2014).*
International Search Report for PCT/DE2016/200397; 2 pgs; dated Dec. 23, 2016 by European Patent Office.

* cited by examiner

PLATE LINK CHAIN

CROSS-REFERENCE TO RELATED APPLICATIONS

This application is the U.S. National Phase of PCT Appln. No. PCT/DE2016/200397 filed Aug. 25, 2016, which claims priority to DE 10 2015 218 125.1 filed Sep. 22, 2015, the entire disclosures of which are incorporated by reference herein.

TECHNICAL FIELD

The present disclosure relates to a plate link chain, in particular for a continuously variable transmission in a motor vehicle, having chain links that comprise link plates which are coupled to one another by pairs of rocker pins and which have at least two different sprocket pitches.

BACKGROUND

German Laid-Open Application DE 199 51 949 A1 discloses a plate link chain having a plurality of chain link plates connected to one another in an articulated manner by pins, wherein the pins extend crosswise relative to the longitudinal direction of the chain, wherein the plate link chain is designed in such a way that the deflection of the plate link chain in at least one direction transversely to the running direction thereof is subject to resistance in order to damp strand vibrations. German Laid-Open Application DE 10 2013 222 925 A1 discloses a plate link chain, in particular for a continuously variable transmission of a motor vehicle, having longer and shorter chain links that comprise longer and shorter link plates which are coupled to one another by pairs of rocker pins and between which there are interspaces in which intermediate elements are arranged.

SUMMARY

It is the object of the present disclosure to improve a plate link chain, in particular for a continuously variable transmission in a motor vehicle, having chain links that comprise link plates which are coupled to one another by pairs of rocker pins and which have at least two different sprocket pitches, in particular in respect of the life of said chain and/or in respect of unwanted strand vibrations during the operation of the plate link chain.

The object is achieved, in the case of a plate link chain, in particular for a continuously variable transmission in a motor vehicle, having chain links that comprise link plates which are coupled to one another by pairs of rocker pins and which have at least two different sprocket pitches, by virtue of the fact that at least one absorption mass is arranged between two pairs of rocker pins in an absorption space within a link plate inner contour. The sprocket pitch corresponds to a spacing between two pairs of rocker pins within the inner link plate contour in a chain longitudinal direction. The link plates with the different sprocket pitches are also referred to as longer or shorter link plates. On the one hand, strand vibrations which occur during the operation of the plate link chain lead to unwanted noise generation during the operation of the plate link chain. Moreover, the plate link chain is subject to greater stress owing to the unwanted strand vibrations, and this has a negative effect on the life of the plate link chain. According to the present disclosure, it is proposed to use spaces—referred to as absorption spaces—that are present within the link plate inner contours to arrange at least one passive absorption mass therein, said absorption mass being subject to play. The absorption mass can move freely to a limited extent in the absorption space, in particular crosswise relative to the chain longitudinal direction. It is thereby possible to greatly reduce the unwanted strand vibrations. In turn, the acoustic properties of the chain are thereby improved during operation. Furthermore, the life of the plate link chain is extended. The absorption mass can be installed at all points in the plate link chain between two pairs of rocker pins in an absorption space within the link plate inner contour. A plurality of absorption masses is preferably installed in corresponding absorption spaces in the plate link chain. It is preferable if no absorption masses are installed in outer link plates of the plate link chain since they could fall out there. However, they can optionally be prevented from falling out of the outer link plates by appropriate measures or means.

An embodiment of the plate link chain discloses that the absorption mass is arranged in such a way between the two pairs of rocker pins within the link plate inner contour, with a defined play transversely to the chain longitudinal direction, that the absorption mass can perform absorption movements transversely to the chain longitudinal direction during the operation of the plate link chain. The defined play of the absorption mass in the absorption space is preferably matched to the absorption mass in such a way that the absorption movements of the absorption mass during the operation of the plate link chain follow a strand movement of the plate link chain with a delay. Transversely also means crosswise relative to the chain longitudinal direction.

Another embodiment of the plate link chain discloses that the defined play in the transverse direction varies over the link plates of the plate link chain. It is thereby possible to further improve the effectiveness of the absorption masses.

Another embodiment of the plate link chain discloses that the absorption mass is arranged in a captive manner in the absorption space. The absorption space can advantageously be configured in such a way that the absorption mass is prevented from falling out. As an alternative or in addition, retention means, such as a cage, can be used to hold the absorption mass captive in the absorption space.

Another embodiment of the plate link chain discloses that the absorption mass is arranged in a double link plate. A double link plate comprises two link plates arranged adjacent to one another, crosswise relative to the chain longitudinal direction. Accordingly, the double link plate is at least twice as thick as one link plate. This provides the advantage that the absorption mass can also be twice as thick as one link plate. In combination with individual link plates, the absorption mass can be prevented from falling out of the absorption space in the double link plate in a simple manner by appropriate arrangement in the plate link chain.

Another embodiment of the plate link chain discloses that the absorption mass is approximately of the same thickness as the link plate or thicker than the link plate. The term "thickness" is used to refer to a dimension of the link plate transversely to a strand plane of the plate link chain.

Another embodiment of the plate link chain discloses that the absorption mass is of plate-shaped design. The absorption mass has substantially the form of a rectangle with rounded corners, for example.

Another embodiment of the plate link chain discloses that the absorption mass is of round, oval, ball-shaped or spherical design or of polygonal design with rounded corners. These embodiments have proven advantageous in tests and studies carried out in the context of the present disclosure.

Another embodiment of the plate link chain discloses that a plurality of absorption masses is arranged in the absorption space. The absorption masses are preferably of such a size and arranged in the absorption space in such a way that they substantially fill the absorption space, apart from the play required to allow the absorption movements.

Another embodiment of the plate link chain discloses that a ratio of a sum of a height and a width of the absorption mass to a sprocket pitch is at least 0.5 and at most 1.5. The term "height" is used to refer to a dimension of the absorption mass transversely to the chain longitudinal direction. The term "width" is used to refer to a dimension of the absorption mass in the chain longitudinal direction.

The present disclosure also optionally relates to an absorption mass for a plate link chain described above. The absorption mass can be handled separately.

The present disclosure furthermore relates to a cone pulley transmission having a plate link chain described above. The cone pulley transmission is preferably a "CVT". In the CVT, the plate link chain is used to connect two sets of cone pulleys for driving purposes. The letters CVT stand for the English words Continuously Variable Transmission and mean that the transmission of the CVT can be adjusted in an infinitely variable manner. In the cone pulley transmission, the plate link chain is surrounded at least partially by a lubricating medium, such as oil. The lubricating medium results in a lubricating medium film or oil film between the intermediate element and adjacent elements of the plate link chain.

BRIEF DESCRIPTION OF THE DRAWINGS

Further advantages, features and details of the present disclosure will become apparent from the following description, in which various illustrative embodiments are described in detail with reference to the drawing, in which.

DETAILED DESCRIPTION

Figure 1:
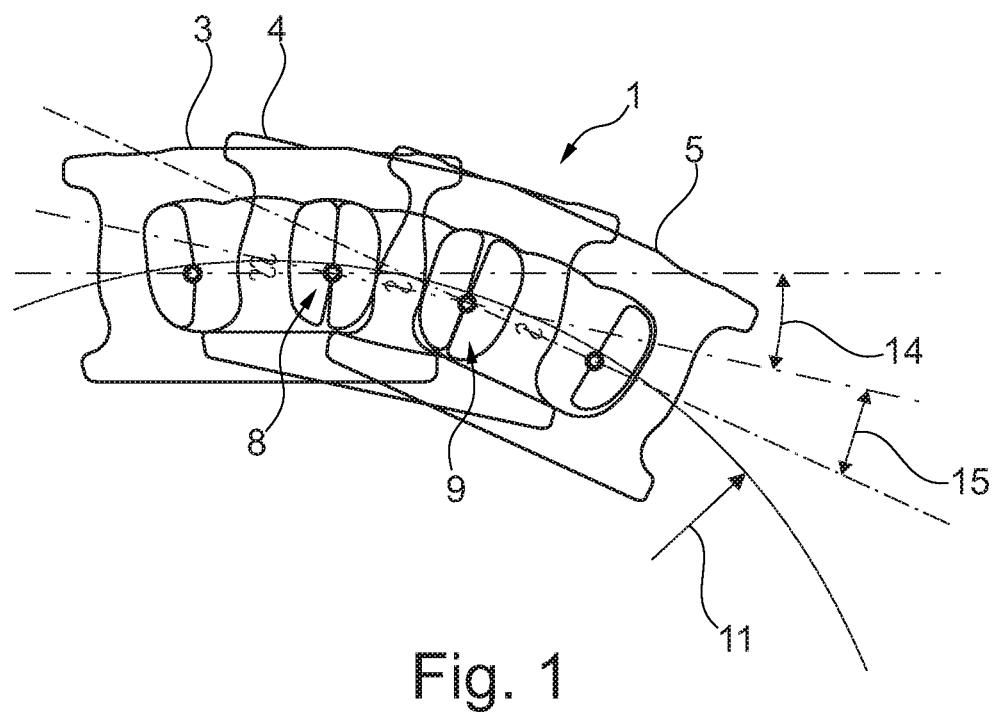
FIG. 1 shows a segment of a plate link chain with three shorter link plates.

FIG. 1 illustrates a segment of a plate link chain 1 having link plates 3, 4, 5 in plan view. Pairs of rocker pins 8, 9 are used to connect the link plates 3, 4, 5 to one another and to other link plates (not visible or not illustrated) of the plate link chain 1. Each pair of rocker pins 8, 9 comprises two rocker pins and is used to form a rocker joint.

In principle, the plate link chain 1 can be embodied in the same way or in a similar way to the plate link chain described in German Laid-Open Application DE 100 47 979 A1. The plate link chain 1 is used in a continuously variable cone pulley transmission of the kind which has likewise been disclosed in said laid-open application.

The plate link chain 1 in FIG. 1 comprises only link plates 3, 4, 5 with the same sprocket pitch. The plate link chain 1 is therefore also referred to as a single-pitch chain or as an equal-pitch chain. The link plates 3, 4, 5 are preferably "shorter" link plates, which are also referred to as "a" link plates. An arrow 11 is used to denote a running radius of the plate link chain 1. Bending angles of the plate link chain 1 are denoted by double arrows 14 and 15.

Figure 2:
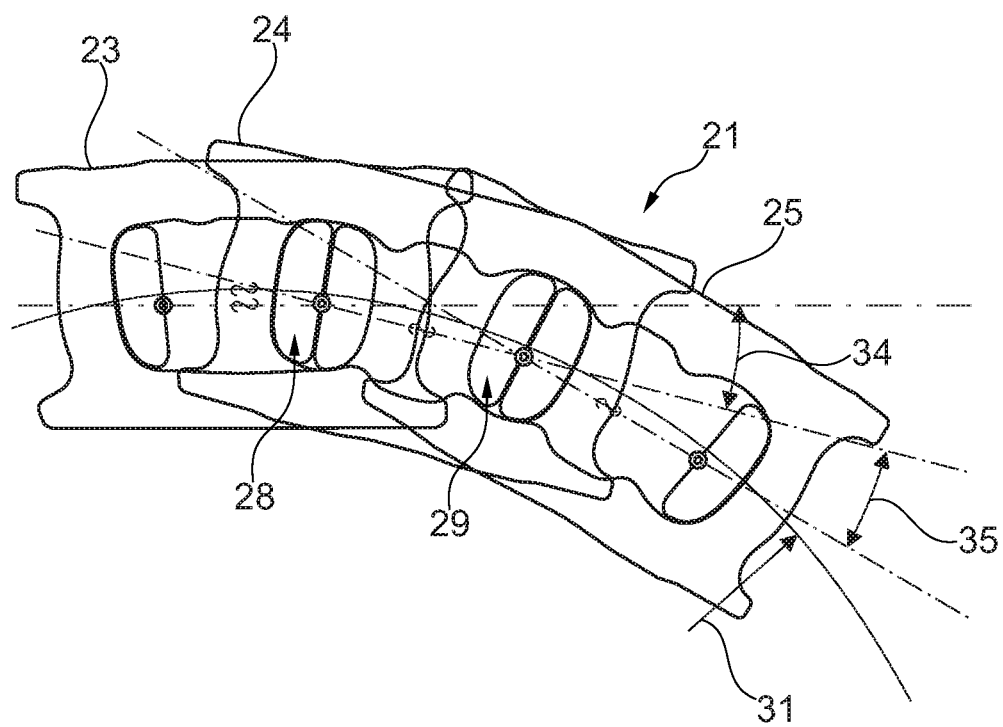
FIG. 2 shows a segment of a plate link chain with one shorter and two longer link plates.

FIG. 2 illustrates a segment of a plate link chain 21 having link plates 23, 24, 25 in plan view. Pairs of rocker pins 28, 29 are used to connect the link plates 23, 24, 25 to one another and to other link plates (not visible or not illustrated) of plate link chain 21. Each pair of rocker pins 28, 29 comprises two rocker pins and is used to form a rocker joint.

In principle, plate link chain 21 can be embodied in the same way or in a similar way to the plate link chain described in German Laid-Open Application DE 100 47 979 A1. Plate link chain 21 is used in a continuously variable cone pulley transmission of the kind which has likewise been disclosed in said laid-open application.

Link plate 23 is a shorter link plate or "a" link plate of the kind which is also used in the plate link chain 1 in FIG. 1. Link plates 24 and 25 are longer link plates, which are also referred to as "b" link plates. Plate link chain 21 thus contains link plates with different sprocket pitches. The longer link plates 24, 25 have a larger sprocket pitch than the shorter link plate 23.

An arrow 31 is used to denote a running radius of plate link chain 21. Bending angles of plate link chain 1 are denoted by double arrows 34 and 35.

Figure 3:
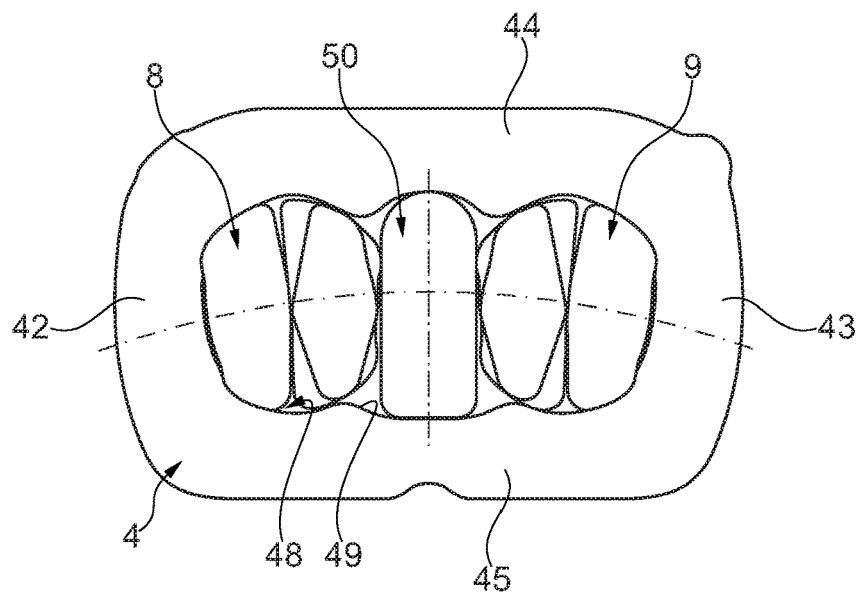
FIG. 3 shows one of the shorter link plates from FIG. 1 in isolation in plan view.

The shorter link plate 4, which is illustrated in isolation in FIG. 3, comprises a left-hand link plate side bar 42 and a right-hand link plate side bar 43. The link plate side bars 42 and 43 are connected integrally to one another at the top by an upper link plate bar 44. At the bottom, the two link plate side bars 42 and 43 are connected to one another by a lower link plate bar 45.

The shorter link plate 4, which is also referred to as a short link plate, comprises an opening 48 having an inner contour 49. The opening 48 having the inner contour 49 is used to accommodate the two pairs of rocker pins 8 and 9. A free space 50 between the two pairs of rocker pins 8, 9 within the inner contour 49 is used to accommodate at least one absorption mass (not illustrated in FIG. 3). The free space is therefore also referred to as absorption space 50.

Figure 4:
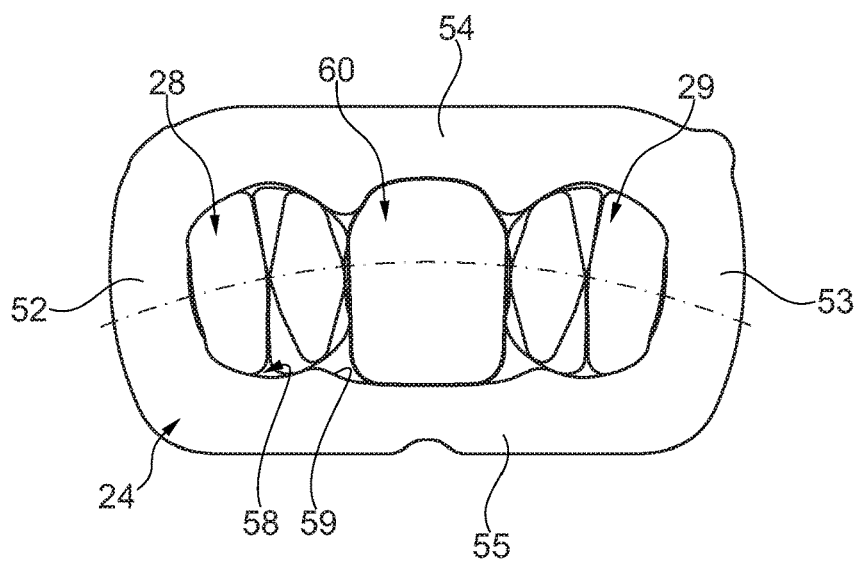
FIG. 4 shows one of the longer link plates from FIG. 2 in isolation in plan view.

The longer link plate 24, which is illustrated in isolation in FIG. 4, comprises a left-hand link plate side bar 52 and a right-hand link plate side bar 53. Link plate side bars 52 and 53 are connected integrally to one another at the top by an upper link plate bar 54. At the bottom, the two link plate side bars 52 and 53 are connected to one another by a lower link plate bar 55.

The longer link plate 24, which is also referred to as a long link plate, comprises an opening 58 having an inner contour 59. The opening 58 having the inner contour 59 is used to accommodate the two pairs of rocker pins 28 and 29. A free space 60 between the two pairs of rocker pins 28, 29 within the inner contour 59 is used to accommodate at least one absorption mass (not illustrated in FIG. 4). The free space is therefore also referred to as absorption space 60.

Figure 5:
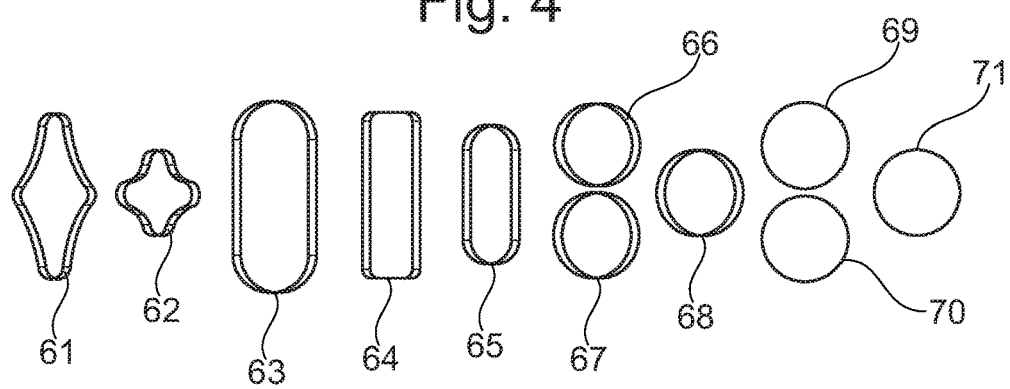
FIG. 5 shows perspective illustrations of various embodiments of absorption masses for use in a shorter link plate of the kind illustrated in FIG. 3.

Various embodiments of the absorption masses 61 to 71 are illustrated in perspective in FIG. 5. The absorption masses 61 to 71 are intended for arrangement in the absorption space 50 of the shorter link plate 4, which is illustrated in FIG. 3. The absorption masses 61 to 71 are of substantially plate-type design and have approximately the same thickness as the link plate 4 in FIG. 3.

Depending on the location of installation, the absorption masses 61 to 71 can also have a greater thickness than the link plate 4 illustrated in FIG. 3. In particular, the greater thickness of the absorption masses 61 to 71 is used to prevent unwanted falling of the absorption mass out of absorption space 50 during the operation of the plate link chain.

Absorption mass 61 has substantially the shape of a diamond with rounded corners. Absorption mass 62 has substantially the shape of a star with rounded corners. Absorption mass 63 has substantially the shape of a rectangle with semi-oval extensions on the short sides of the rectangle.

Absorption mass 64 has substantially the shape of a rectangle with rounded ends. Absorption mass 65 has approximately the same shape as absorption mass 63 but is of shorter design.

Absorption masses 66 and 67 have the shape of circular plates and are arranged together in the absorption space 50 of link plate 4. Absorption mass 68 has the shape of a circular plate and can be arranged alone in the absorption space 50 of link plate 4.

Absorption masses 69 to 71 have the shape of balls. The two absorption masses 69 and 70 can be arranged together in the absorption space 50 of link plate 4. The ball-shaped absorption mass 71 is arranged alone in absorption space 50.

Figure 6:
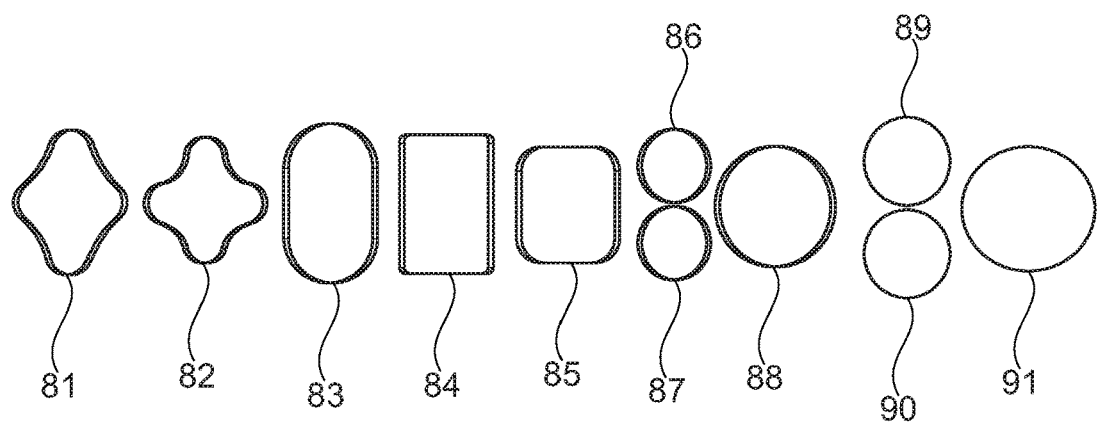
FIG. 6 shows perspective illustrations of various embodiments of absorption masses for use in a longer link plate of the kind illustrated in FIG. 4.

Various embodiments of absorption masses 81 to 91 are illustrated in perspective in FIG. 6. Absorption masses 81 to 91 are intended for arrangement in the absorption space 60 of the longer link plate 24, which is illustrated in FIG. 4. Absorption masses 81 to 91 are of substantially plate-type design and have approximately the same thickness as the link plate 24 in FIG. 4.

Depending on the location of installation, absorption masses 81 to 91 can also have a greater thickness than the link plate 24 illustrated in FIG. 4. In particular, the greater thickness of absorption masses 81 to 91 is used to prevent unwanted falling of the absorption mass out of absorption space 60 during the operation of the plate link chain.

Absorption mass 81 has substantially the shape of a diamond with rounded corners. Absorption mass 82 has substantially the shape of a star with rounded corners. Absorption mass 83 has substantially the shape of a rectangle with semi-oval extensions on the short sides of the rectangle.

Absorption mass 84 has substantially the shape of a rectangle with rounded ends. Absorption mass 85 has approximately the same shape as absorption mass 83 but is of shorter design and has larger rounding radii in the corners.

Absorption masses 86 and 87 have the shape of circular plates and are arranged together in the absorption space 60 of link plate 24. Absorption mass 88 has the shape of a circular plate and can be arranged alone in the absorption space 60 of link plate 24.

Absorption masses 89 to 91 have the shape of balls. The two absorption masses 89 and 90 can be arranged together in the absorption space 60 of link plate 24. The ball-shaped absorption mass 91 is arranged alone in absorption space 60.

Figure 7:
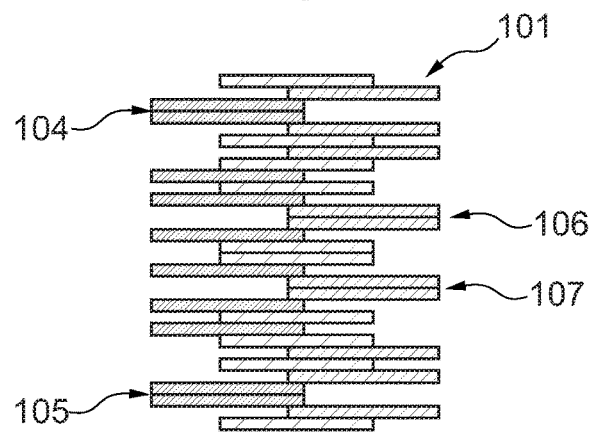
FIG. 7 shows a segment of a plate link chain in a triplet arrangement with double link plates.

FIG. 7 shows a plate link chain 101 having shorter and longer link plates in a "triplet" construction. The triplet construction is also referred to as a group of three plates. The longer and shorter link plates or chain links have different pitches in order to allow "randomization".

Plate link chain 101 comprises four double link plates 104 to 107 in the segment illustrated. The double link plates 104 to 107 each comprise two identical link plates. The double link plates 104 to 107 have absorption spaces of the kind denoted by 50 and 60 in FIGS. 3 and 4.

Absorption masses that are twice as thick as those installed in individual link plates can be installed in the absorption spaces of the double link plates 104 to 107. This reduces the risk that they would fall or slip out of the respective absorption space.

Figure 8:
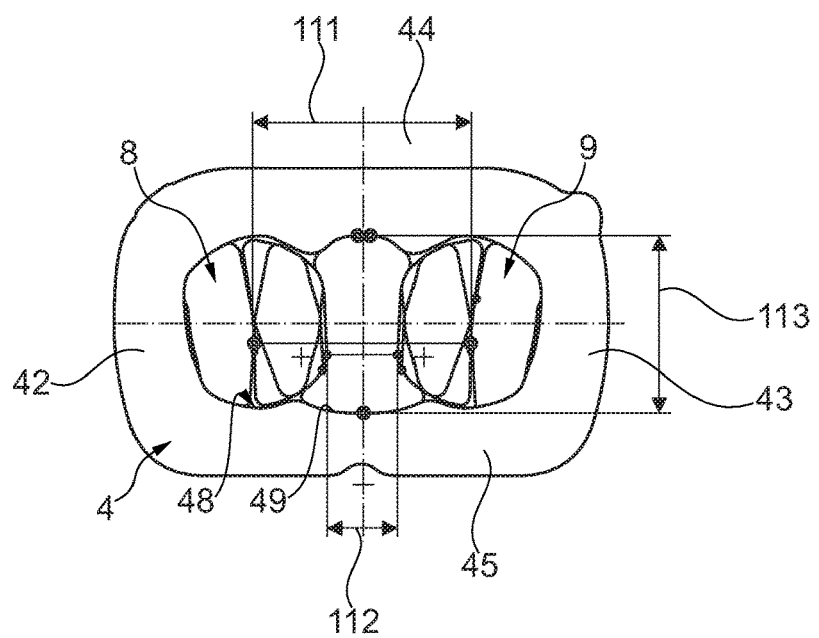
FIG. 8 shows a similar illustration to that in FIG. 3 to illustrate a sprocket pitch and dimensions of the link plate.

FIG. 8 illustrates the shorter link plate 4 from FIG. 3 with double arrows 111, 112 and 113 to illustrate size ratios. Double arrow 111 illustrates a sprocket pitch, which is also referred to as pitch.

Double arrow 112 illustrates a width of an absorption mass or of an absorption space between the pairs of rocker pins 8 and 9. Double arrow 113 illustrates a height of the absorption mass or of the absorption space within the inner contour 49 of link plate 4.

A ratio between the width 112 and the height 113 of the absorption mass to the pitch 111 of link plate 4 should vary only between 0.5 and 1.5. The best results were obtained at these values in tests and studies carried out in the context of the present disclosure.

By arranging the absorption masses in the absorption spaces, it is possible, in particular, to achieve acoustic advantages through damping/absorption. Moreover, the chain strength of the plate link chain can be increased by the absorption masses in the absorption spaces. Among the advantages thereby achieved is that part of a guide and/or "bending tips" on the link plates can be eliminated.

If required, the absorption masses can also be installed together with conventional slide rails. By means of the absorption masses, the mass distribution can be varied in any desired manner. Absorption masses can advantageously be installed at all points in the plate link chain.

LIST OF REFERENCE SIGNS 1 plate link chain
3 link plate
4 link plate
5 link plate
8 pair of rocker pins
9 pair of rocker pins
11 arrow
14 double arrow
15 double arrow
21 plate link chain
23 link plate
24 link plate
25 link plate
28 pair of rocker pins
29 pair of rocker pins
31 arrow
34 double arrow
35 double arrow
42 left-hand link plate side bar
43 right-hand link plate side bar
44 upper link plate bar
45 lower link plate bar
48 opening
49 inner contour
50 absorption space
52 left-hand link plate side bar
53 right-hand link plate side bar
54 upper link plate bar
55 lower link plate bar
58 opening 59 inner contour
60 absorption space
61 absorption mass
62 absorption mass
63 absorption mass
64 absorption mass
65 absorption mass
66 absorption mass
67 absorption mass
68 absorption mass
69 absorption mass
70 absorption mass
71 absorption mass
81 absorption mass
82 absorption mass
83 absorption mass
84 absorption mass
85 absorption mass
86 absorption mass
87 absorption mass
88 absorption mass
89 absorption mass
90 absorption mass
91 absorption mass
101 plate link chain
104 double link plate
105 double link plate
106 double link plate
107 double link plate
111 double arrow
112 double arrow
113 double arrow

The invention claimed is:

1. A plate link chain for a continuously variable transmission in a motor vehicle, comprising:
   chain links having link plates coupled to one another by pairs of rocker pins and having at least two different sprocket pitches, wherein at least one absorption mass is arranged between two pairs of rocker pins in an absorption space within a link plate inner contour of one of the link plates and no absorption masses are installed in an outer link plate of the plate link chain.

2. The plate link chain as claimed in claim 1, wherein the at least one absorption mass is arranged between the two pairs of rocker pins within the link plate inner contour, and has a defined play in a direction transverse to a chain longitudinal direction, such that the at least one absorption mass can perform absorption movements in the direction transverse to the chain longitudinal direction during an operation of the plate link chain.

3. The plate link chain as claimed in claim 2, wherein the defined play in the direction transverse to the chain longitudinal direction varies over the link plates of the plate link chain.

4. The plate link chain as claimed in claim 1, wherein the at least one absorption mass is arranged in such a way that the at least one absorption mass is prevented from falling out of the absorption space.

5. The plate link chain as claimed in claim 1, wherein the absorption mass is arranged in a double link plate.

6. The plate link chain as claimed in claim 1, wherein the at least one absorption mass is approximately of a same thickness as the link plate or thicker than the link plate.

7. The plate link chain as claimed in claim 1, wherein the at least one absorption mass is of plate-shaped design.

8. The plate link chain as claimed in claim 1, wherein the absorption mass is of round, oval, ball-shaped or spherical design or of polygonal design with rounded corners.

9. The plate link chain as claimed in claim 1, wherein a plurality of absorption masses are arranged in the absorption space.

10. The plate link chain as claimed in claim 1, wherein each sprocket pitch in the at least two different sprocket pitches corresponds to a spacing between two pairs of rocker pins within the inner link plate contour in a chain longitudinal direction.

11. A plate link chain for a continuously variable transmission in a motor vehicle, comprising:
    a plurality of link plates coupled to one another by pairs of rocker pins and having at least two link plates of different length, wherein:
    each link plate includes an absorption space arranged between two pairs of rocker pins
    at least one absorption mass is arranged within the absorption space of one of the link plates in such a manner that the absorption mass can move freely to a limited extent and
    no absorption masses are installed in an outer link plate of the plate link chain.

12. The plate link chain as claimed in claim 11, wherein the at least one absorption mass is sized and arranged in the absorption space in such a way that the at least one absorption mass substantially fills the absorption space.

* * * * *